US009365993B1

(12) United States Patent
Moore, Jr. et al.

(10) Patent No.: US 9,365,993 B1
(45) Date of Patent: Jun. 14, 2016

(54) DRAINAGE UNIT HAVING A QUILT EXTERIOR

(71) Applicant: Infiltrator Systems, Inc., Old Saybrook, CT (US)

(72) Inventors: Roy E. Moore, Jr., Killingworth, CT (US); Paul R. Holbrook, Old Saybrook, CT (US); Daniel Swistak, Newmarket, NH (US)

(73) Assignee: INFILTRATOR WATER TECHNOLOGIES LLC, Old Saybrook, CT (US)

( * ) Notice: Subject to any disclaimer, the term of this patent is extended or adjusted under 35 U.S.C. 154(b) by 0 days.

(21) Appl. No.: 14/329,960

(22) Filed: Jul. 13, 2014

Related U.S. Application Data

(60) Provisional application No. 61/845,801, filed on Jul. 12, 2013.

(51) Int. Cl.
E02B 11/02 (2006.01)
E02B 11/00 (2006.01)

(52) U.S. Cl.
CPC .................... *E02B 11/005* (2013.01)

(58) Field of Classification Search
CPC ...................................... E02B 11/005
See application file for complete search history.

(56) References Cited

U.S. PATENT DOCUMENTS 3,441,140 A * 4/1969 Thurber ................ E02B 11/005
                                                  210/170.07
3,936,380 A * 2/1976 Boske ...................... C02F 1/688
                                                  210/170.07
4,538,387 A * 9/1985 Barnett ................... E02D 31/02
                                                  428/167
5,015,123 A    5/1991 Houck et al.
5,100,258 A * 3/1992 VanWagoner ........... E02B 11/00
                                                  405/36
5,154,543 A   10/1992 Houck et al.
5,535,499 A    7/1996 Houck et al.
5,657,527 A    8/1997 Houck et al.
5,954,451 A    9/1999 Presby
6,173,483 B1   1/2001 Houck et al.
6,461,078 B1  10/2002 Presby
6,467,996 B1  10/2002 Garner
6,497,031 B1  12/2002 Houck et al.
6,854,924 B2   2/2005 Ring
7,178,224 B2   2/2007 Bussey, Jr.
7,475,477 B2   1/2009 Bussey, Jr.
7,600,308 B2  10/2009 Bussey, Jr.
8,256,990 B2 * 9/2012 Koerner ................ E02B 11/005
                                                  405/36
8,815,094 B2   8/2014 Presby
2007/0098500 A1* 5/2007 Harr ....................... E01F 5/005
                                                  405/43
2013/0105392 A1 5/2013 Presby

OTHER PUBLICATIONS

Presby Environmental Inc., Advanced Enviro-Septic Treatment System, www.presbyeco.com, Oct. 21, 2014, p. 1-5.

* cited by examiner

*Primary Examiner* — John Kreck
(74) *Attorney, Agent, or Firm* — C. Nessler

(57) ABSTRACT

A substantially cylindrical drainage unit for use when buried in soil as part of a wastewater leach field comprises a first plastic aggregate mass that is contained within netting, with an optional central perforated pipe. A segmented quilt comprises the exterior surface of the drainage unit which is in contact with soil. Pebble aggregate that is smaller in particle size than the first aggregate is contained with the cavities of the quilt segments. Quilts having different segment shapes and sizes are manufactured by specialized apparatus which creates rectilinear or serpentine seams.

22 Claims, 9 Drawing Sheets

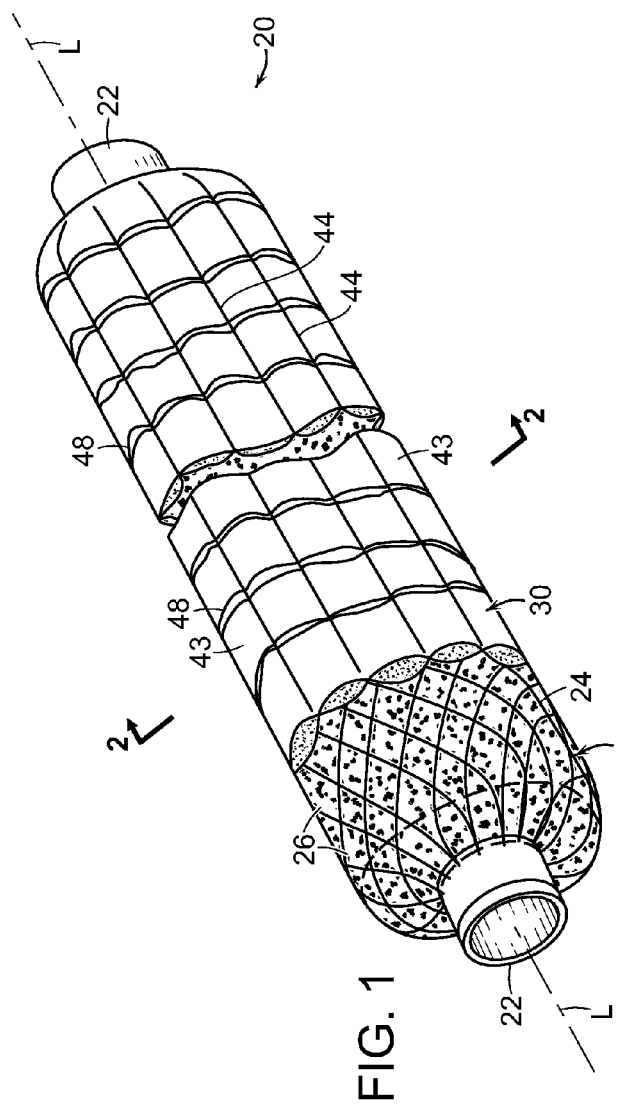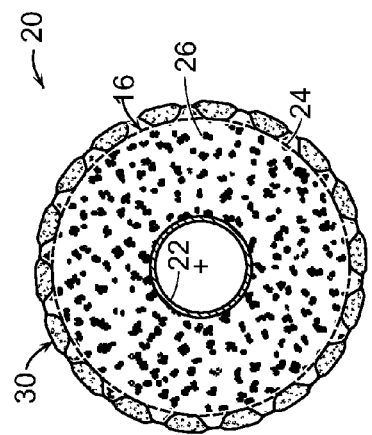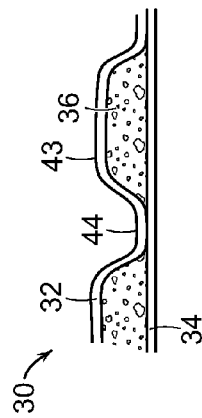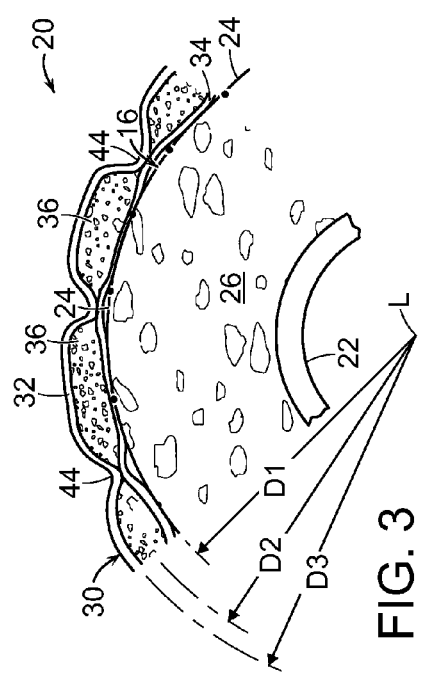

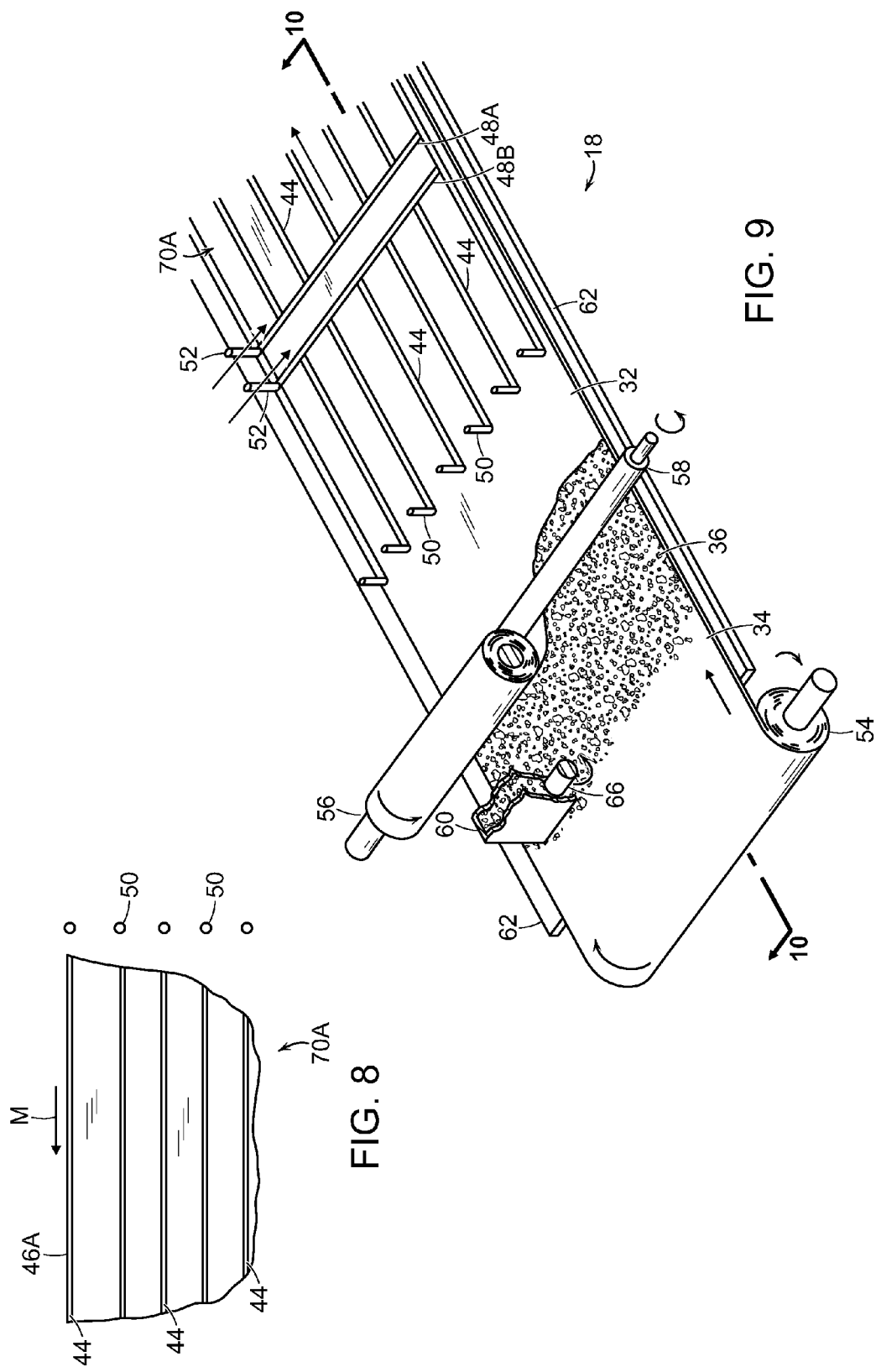

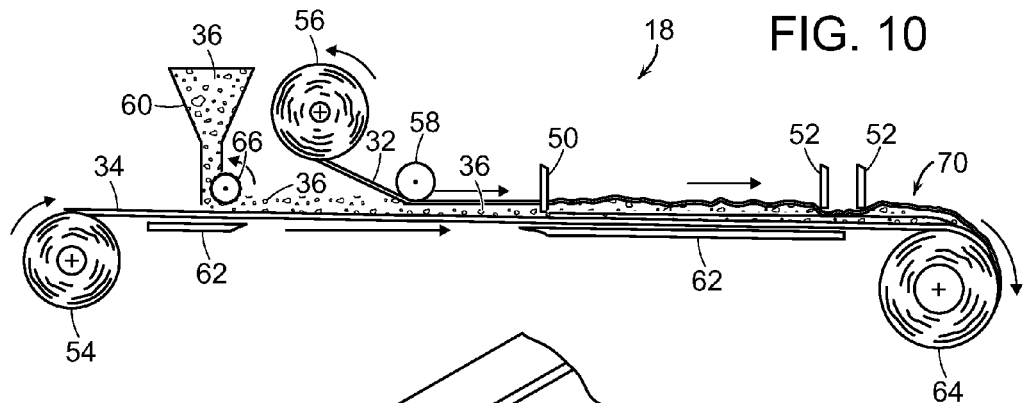
FIG. 10
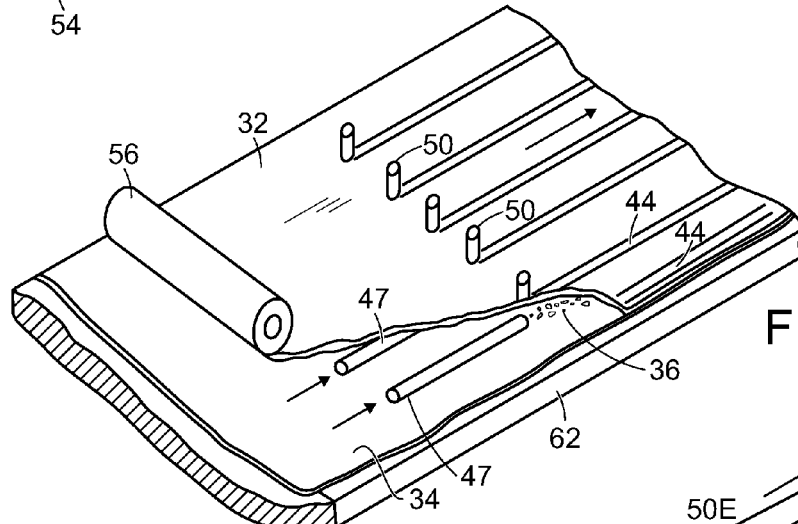
FIG. 10A
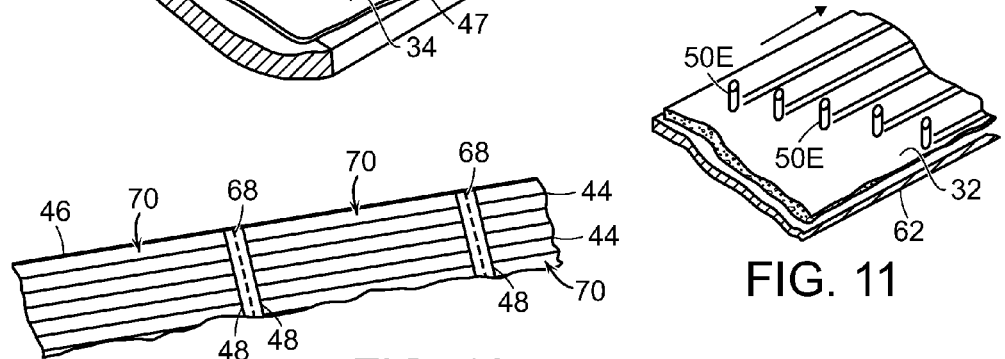
FIG. 11
FIG. 12
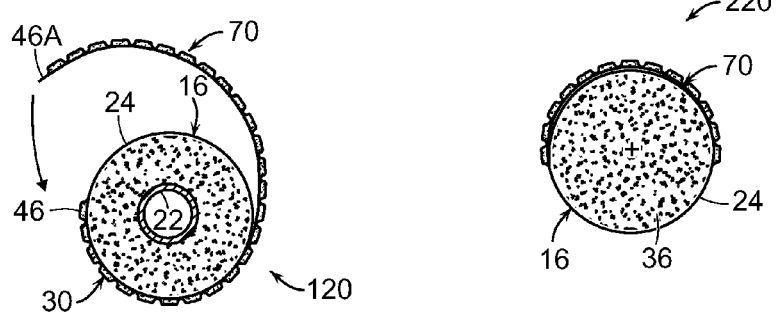
FIG. 13
FIG. 13A

DRAINAGE UNIT HAVING A QUILT EXTERIOR

This application claims benefit of provisional patent application Ser. No. 61/845,801, filed Jul. 12, 2013.

TECHNICAL FIELD

The present invention relates to drainage units which may be used in wastewater disposal systems and other underground systems for gathering or dispersing water.

BACKGROUND

It is long been common to flow wastewater issuing from septic tanks of subsurface wastewater treatment systems to rows of structures buried in trenches within the soil, generally called leaching fields. Older leaching field systems comprise a crushed stone-filled trench with a lengthwise running pipe. More modern systems include prefabricated drainage units which are placed in trenches back-filled with stone and soil. One kind of such drainage unit comprises a generally cylindrical shape mass of plastic bead aggregate which is contained within in a sleeve of netting. Typically, a perforated pipe runs down the center of the mass of aggregate to distribute wastewater along the length of the drainage unit.

A familiar commercial example of such a unit is an EZflow® drainage unit, sold by Infiltrator Systems, Inc. The units are easily handled by installers and may be placed in straight or curved trenches. Typically, downward infiltration of soil or other overlying material into the interstices of the aggregate of a drainage unit is inhibited by use of a permeable geotextile fabric that is either laid on top of the unit after placement, or that has been attached to or integrated with the exterior of the unit. For instance, geotextile may be attached to the sleeve which retains the aggregate or may be a component of the sleeve. See U.S. Pat. No. 6,854,924 and U.S. Pat. No. 8,256,990 for examples. When such geotextile is part of a manufactured drainage unit the geotextile layer has been referred to as a barrier.

During use, wastewater flows outwardly from a drainage unit into the surrounding soil, sand or gravel. If the rate of inflow exceeds the rate of outflow into the surrounding soil, wastewater will be stored in the interstices of the aggregate. Much attention had been paid by designers, installers, repairmen and regulators to what happens at the interface between the drainage unit exterior surface and the surrounding soil or other medium. A so-called biomat is often observed at interfaces between a wastewater leaching unit and surrounding soil. When a drainage unit comprises a geotextile barrier, suspended solids in the wastewater can build up on the barrier, when they are too large to pass through the openings in the fabric of the barrier. That can inhibit the flow of water from the drainage unit into the surrounding soil. Thus, it has been considered by some that it is a disadvantage, or at least not necessary, to run a geotextile barrier all around the outer surface of a drainage unit, since geotextile is primarily needed to prevent infiltration of soil at the top, and to a lesser degree the sides. Generally, there is a continuing effort to enhance the performance of drainage units with respect to treatment of wastewater and avoiding degradation over time of use.

SUMMARY

An object of the invention is to provide an aggregate type drainage unit that is useful for leaching system application, in particular a unit which has improved soil-interface characteristics or improved capacity for handling suspended solids. A further object of the invention is to provide a method and apparatus for making drainage units having surface regions with enhanced wastewater treatment properties, in particular exteriors which comprise finer aggregates and increased surface area.

In accord with the invention, an embodiment of drainage unit comprises a generally cylindrical mass of first plastic aggregate (particulate) which is circumscribed by a quilt made of geotextile fabric. The quilt comprises a multiplicity of segments having cavities filled with second plastic aggregate (pebbles) which are smaller in size and larger in surface area than the first aggregate. An optional perforated pipe runs along the length of the mass of first plastic aggregate, and when the pipe is present the quilt is secured by ties to the exposed pipe ends. A preferred quilt comprises two layers of fabric, with the innermost layer being more water permeable than the outermost layer. A preferred quilt construction presents an undulating surface to the surrounding soil; the surface area per unit length of the drainage unit exterior is at least 1-2 percent, and preferably a least up to 7 percent, greater in than the surface area per unit length of a same-size drainage unit having a smooth geotextile surface, as characterizes prior art units. A quilt provides the exterior region of a drainage unit with a wastewater treatment region which is different that which exists within the first aggregate. The ability of a drainage unit to handle suspended solids is enhanced.

In an embodiment of the invention the first aggregate is kept in place as a cylindrical mass by means of a quilt which is in the form of a sleeve. In another embodiment, the first aggregate is contained by a first sleeve of netting, as in the prior art; and the quilt wraps around that assembly (which is called here an essential drainage unit). The quilt may be fabricated in the form of a rectangular blanket which is then wrapped around the essential drainage unit and secured to itself. Alternatively, a second sleeve of netting which circumscribes the exterior of the wrapped-around quilt and keeps it in place. In other embodiments of the invention, a quilt runs only partially around the circumference of a drainage unit.

In embodiments of the invention the quilt comprises a base layer of geotextile and a cap layer of geotextile which are attached to each other at seams. The cap layer is a layer which becomes the most contoured most during fabrication of a quilt; and it has the greater undulating surface in the finished quilt. Either the cap layer or the base layer may be in closest proximity to the first aggregate mass of a drainage unit. The layer which is closest to the first aggregate mass preferably has a higher permeability than the other layer; and usually there is higher stiffness and lesser undulation associated with the lower permeability geotextile layer which presents as the exterior of the drainage unit.

Quilt geotextile layers are joined to each other by a multiplicity of seams which define the quilt segments. The quilt segments may have different shapes, including lengthwise strips, rectangles, or curved portions. Preferably, the quilt segments are rectangles defined by a combination of longitudinal seams and transverse seams (relative to the lengthwise axis of the drainage unit). Preferably rectangular quilt segments are oriented relative to each other so that the transverse running seams align and form as circumferential bands that facilitate bending of a drainage unit in order to fit within a curved trench in soil during use.

Drainage units having quilts may be in part fabricated in different ways, including by joining together two geotextile layers at seams by means of sewing, ultrasonic welding, fusion welding, etc. to form a two-layer quilt structure. In one approach, the sheet layers are run horizontally while aggregate is deposited within the cavities of the quilt segments being formed. Preferably, rectilinear quilt segments are formed by means a combination of lengthwise and transverse moving fastening heads. Serpentine seams may run within parallel lengthwise band regions. In another method of quilt formation, the fabric layers are mated and seamed—preferably by ultrasonic welding—so there are created vertical channels between downwardly moving layers within a fabricating apparatus. Pebble aggregate is dropped into upper ends of the vertical channels preferably by a shuttle mechanism which meters the amount of aggregate. A horizontal seam is then formed just above the elevation of aggregate after it is deposited in a vertical channel, to create a desired rectangular segment.

The foregoing and other objects, features and advantages of the present invention will become more apparent from the following description of preferred embodiments and accompanying drawings.

BRIEF DESCRIPTION OF THE DRAWINGS

FIG. 1 is a perspective partial-cutaway view of a drainage unit of the present invention which has a central flow distribution pipe and comprises an exterior surface which is a segmented quilt.

FIG. 2 is a diametrical cross section through the drainage unit shown in FIG. 1.

FIG. 2A is a cross section through the quilt, in flattened condition, of the drainage unit of FIG. 1, FIG. 3 is a fragmentary view of the cross section shown in FIG. 2, to provide more detail.

FIG. 8 is a view like FIG. 6, showing a portion of a quilt having segments which are lengthwise strips.

FIG. 9 is a perspective simplified view of apparatus for forming a quilt, along with a quilt in the process of being fabricated. The quilt moves horizontally during fabrication, when aggregate is captured in channels between the mating geotextile sheets of the quilt.

FIG. 10 is a side elevation cross section of the apparatus and quilt shown in FIG. 9.

FIG. 10A is a fragmentary view of a modification of the apparatus shown in FIG. 9, wherein aggregate is deposited within the channels of a being-formed quilt by means of tubes.

FIG. 11 is a fragmentary view showing a modification of the FIG. 9 apparatus, in particular, where sewing heads are staggered apart in the downstream direction.

FIG. 12 is a partial top view of quilt structure produced by the apparatus of FIG. 9, showing where the structure can be cut into individual quilts for incorporation into a drainage unit.

FIG. 13 is a diametrical cross section of a drainage unit being formed, showing how a quilt may be wrapped around the exterior of an essential drainage unit so the ends overlap.

FIG. 13A is a diametrical cross section of a drainage unit having a quilt which only partially goes around the circumference of the unit. The drainage unit also lacks a central pipe.

DESCRIPTION

Figure 5:
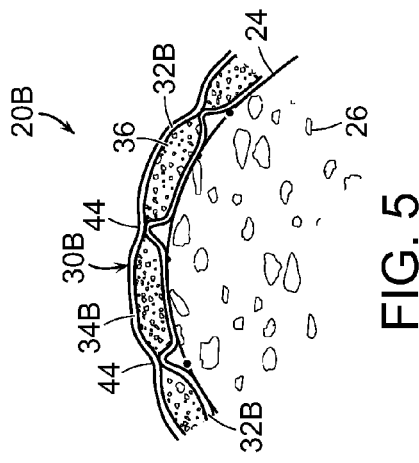
FIG. 5 is a fragmentary view like that of FIG. 3, showing a drainage unit with a quilt having the base layer of the quilt as the exterior surface, with a resultant a lesser amount of undulation than has the quilt shown in FIG. 3.

FIG. 1 is a perspective view of an exemplary drainage unit 20 of the present invention comprising a quilt-exterior. FIG. 2 is a partial diametrical cross section of drainage unit 20. FIG. 2A a portion of the quilt only in flattened condition. In use, drainage units 20 are connected end to end to form a string, and strings of units are typically arranged as parallel spaced apart rows in a leaching field. The term "drainage unit" is used for simplicity here and should not be considered limiting. The term comprehends units which are useful for treating and dispersing wastewater in soil, for storing and dispersing rainwater in soil or, alternatively, for gathering water from saturated soil. A preferred embodiment of the invention is described below in terms of the use of the invention in connection with treatment of wastewater. Other uses of drainage unit of the present invention include dispersing other liquids within permeable particulate masses, and collecting liquids from same when they are saturated.

Drainage unit 20 is an improvement over prior art drainage units which units may be incorporated as portions of embodiments of the present invention. Reference may be made to the drainage unit described in U.S. Pat. No. 5,015,123 and U.S. Pat. No. 6,497,031, both of Houck et al. and the methods of making described therein. The disclosures of the foregoing patents are hereby incorporated by reference.

An essential drainage unit, as the term is used herein, is a reference to that portion of the present invention which is made in accord with the teachings of the foregoing patents or which is comparable to units which are presently known in commerce. An embodiment of essential drainage unit 16 which is a portion of exemplary drainage unit 20 shown in FIG. 1 is generally cylindrical in shape and typically will be 8 to 12 inches in diameter and 10 feet in length. A mass of plastic aggregate 26, preferably polystyrene beads, is contained within a sleeve 24 made of plastic netting which has openings small enough to contain the aggregate. As known in the prior art, the netting generally presents as having diamond shape openings; other shape openings may be used. As illustrated and described below, the netting of sleeves used in the present invention may be generally characterized as having uniform size openings. In the generality of the invention, a sleeve of netting may have openings which vary in size, including that a portion of the sleeve made of netting may comprise an integral or attached geotextile barrier as described in prior art patents, including U.S. Pat. No. 8,256,990 of Koerner, the disclosure of which is hereby incorporated by reference.

Aggregate 26 is preferably expanded polystyrene that is about ¾ inch to 1¼ inch in dimension and has a ribbed shape like that shown in U.S. Pat. No. 6,467,996 of Garner, the disclosure of which is hereby incorporated by reference. Perforated pipe 22, preferably a common flexible corrugated plastic drainage pipe, runs lengthwise along axis L of the drainage unit, through the center of the aggregate 26. In the generality of the invention, the pipe may be off-center. The presence of the pipe is optional in the generality of the invention.

The essential drainage unit 16 and the whole drainage unit 20 are referred to herein as being generally cylindrical and as having diameters. These terms should be construed loosely and applied reasonably on a nominal basis, since the nature of the non-rigid materials involved means that the drainage units may have irregular, e.g., oblong, cross sections and the nominal diameters of cross sections may vary along the length of a unit. Embodiments of the invention may comprehend units having non-round cross sections, for instance rectangular cross sections. Presently, those cross sections would be more difficult to make.

In accord with the present invention, quilt 30 forms the exterior surface of the drainage unit 20. The exemplary quilt 30 of unit 20 is comprised of two layers 32, 34 of water permeable fabric which are attached to each other in a way which defines a multiplicity of nominally rectangular, preferably square, segments 43. The exterior surface of the drainage unit 20 is uneven and undulating due to the seams which define the quilt segments. Thus the drainage unit 20 presents to a surrounding particulate medium more surface area than is presented when a drainage unit of the same exterior diameter has an exterior surface that comprises a layer of geotextile without quilting, as in the prior art. The segments 43 are defined by lengthwise seams 44 and transverse seams 48 which are preferably aligned as shown so that seams 48 circumscribe the drainage unit. As described below, other shape quilt segments may be used. Each quilt segment 43 has an interior cavity filled with a second aggregate 36, often called pebbles herein.

FIG. 3 is a more detailed view of a portion of the drainage unit cross section shown in FIG. 2 and FIG. 2A is a detail view of the quilt by itself. From both Figures it can be seen that quilt 30 is comprised to two layers of geotextile, namely base layer 34 and cap layer 32, which are attached to each other at seams. The terminology "base" and "cap" is reflective of the manner in which the quilt is typically formed, but the terminology should not be considered as limiting. In a preferred quilt fabrication process, the cap layer is contoured with lengthwise peaks and valleys prior to or during the seaming process by which it is attached to the base layer. After a quilt is formed the base layer will tend to have a contoured surface, as an effect of the seams. In different embodiments either the cap layer or the base layer may present on the exterior of the drainage unit.

The layer of a quilt which presents as the exterior of a drainage unit will be made of a geotextile which is sufficiently durable to withstand mechanical and environmental stresses during handling, installation and use of the drainage unit. A lesser performance material—and therefore often lighter weight material—can be used as the layer of the quilt which faces toward the center of the drainage unit. Thus it will be appreciated that the lighter-weight layer will typically be more substantially contoured than the other layer. As described below, in different embodiments of the invention, either the cap layer or the base layer may present toward the exterior of a drainage unit.

In the FIG. 3 embodiment, the base layer 34 of the quilt is in contact with netting sleeve 24 and any aggregate which lies within the spacing of the ligaments of the netting of the sleeve. The mesh size of the sleeve netting is large relative to the size of the beads of aggregate 26, but sufficient to retain it. Sleeve 24 will typically allow portions of aggregate to protrude a bit through the openings of the netting, as characterizes prior art essential drainage units. For purposes of clarity of illustration, the thicknesses and radial spacing of layers 32, 34 are exaggerated. See representative dimensions of an exemplary drainage unit, discussed below.

Contained within the space between the two fabric layers 32, 34 is a second aggregate, namely aggregate 36, called here pebbles 36 to emphasize a distinction with the preferably coarser beads of first aggregate 26. (Nonetheless, in the generality of the invention, a first aggregate might be nominally the same size as the second aggregate.) Pebbles 36 are preferably short expanded polystyrene cylinders, shaped like pills, with both a diameter and length of about one-quarter inch (about 6 mm) and a density of about 0.7 to 1.2 pounds per cubic foot (about 11.2 to 19.2 kilogram per cubic meter). Generally, a quilt is thin compared to the thickness of the first aggregate mass, since the quilt is principally concerned with wastewater treatment near the exterior surface of the drainage unit, whereas the first aggregate mass has a primary function of providing a space within the earth for storage and distribution of water. A typical quilt thickness will be between about three-eighth and five-eighth inch (about 1 cm and 1.6 cm). See the example below.

Referring to FIG. 3 and drainage unit 20, the essential drainage unit 16 portion has a diameter D1 and has an associated cylindrical surface area per unit length, called A1. D3 is the diameter of an imaginary cylinder circumscribing the exterior of the unit 20. D2 is the average diameter of the quilt, i.e., the average of diameters D1 and D3, having an associated cylindrical surface area per unit length, called A2. The undulating exterior surface of the drainage unit 20 formed by fabric 32 thus has a surface area per unit length which is greater than the surface area per unit length A1, A2 or A3 which would be provided by a drainage unit having a un-quilted exterior surface comprising the same fabric which characterizes layer 32 or layer 34. A reference to the surface area per unit length is a reference to the property which characterizes the central fifty percent of the drainage unit; that is, the effects of the contours and distortions of a quilt toward each end of the drainage unit are ignored in the calculation.

An essential drainage unit having a diameter D1, with geotextile lying on the surface provided by the aggregate 26 and netting 24, may have some unevenness reflective of the unevenness of the aggregate which protrudes through the spaces of the netting of sleeve 24, but in context of the present invention is will be considered as being substantially smooth. By way of example, an exemplary invention drainage unit 20 comprises an about 10.7 inch (27 cm) diameter (D1) exemplary essential drainage unit 16. The exemplary unit 20 comprises a circumscribing quilt 32 of about five-eighth inch (about 1.6 cm) thickness, and thus the unit 20 has a diameter (D3) of nominally 12 inches (30.5 cm).

The seams of exemplary quilt are about one quarter inch (about 0.6 cm) wide at the location where the two layers of geotextile are attached to each other. An exemplary quilt 32 shown in FIG. 8 has long rectangular strip-like segments where the seams are about 4.5 inch (about 11.5 cm) spaced apart. The exemplary quilt 30 shown in FIG. 1 has square segments about 4.5 inch square. The segments are about five-eighth inch thick midway between the seams.

An exemplary drainage unit in accord with the invention has a quilt surfaced exterior which has a surface area per unit length that is at least 1-2 percent, preferably about 5-7 percent or more, greater than the surface area per unit length of a smooth surface (un-quilted drainage) unit. When the quilt has nominally square segments or curved or round segments as described herein, the undulation and surface area advantage can be greater than when the segments are lengthwise (rectangular) strips. The greater surface area of the invention drainage unit provides an advantage in usefulness by increasing the area of particulate medium (e.g., sand or gravel or soil) which is in contact with the exterior of the drainage unit. So, to the extent the leaching capacity of a drainage unit is limited by the permeability or flow rate of the geotextile or by the surface area of the soil or other medium which is in contact with fluid flow openings on the exterior of the drainage unit, then the invention will offer an advantage over the prior art. Typical embodiments of drainage units may have diameters between 10 and 12 inch (25 and 30 cm) and a nominal length of 10 feet (2.5 meter), or as desired.

While an undulating exterior quilt surface is preferred for the reasons just given, within the scope of invention a drainage unit embodiment may have a quilt surface which is substantially smooth. As noted elsewhere, such a quilt provides other wastewater treatment benefits, relating to the aggregate surface area of the quilt, as described elsewhere herein. FIG. 5 shows, as an example, quilt 30B of drainage unit 20B, where the an exterior base layer 32B is has less undulation than the inner cap layer 34B This FIG. 5 configuration of drainage unit is representative of a unit which may be made using a quilt produced by the method described in connection with FIGS. 15-18. It is also an example of how quilt may be configured in an embodiment of the drainage unit shown in FIGS. 19 and 19A.

For practical cost and weight reasons, and for resisting corrosion, the aggregate 36 is a non-metallic material, preferably plastic. Optionally a ceramic such as vermiculite or ceramic foam may be used. As mentioned, a preferable material of aggregate is expanded polystyrene, well-known in the art for such purpose. Other plastics which may be used include polyethylene and polypropylene.

Figure 4:
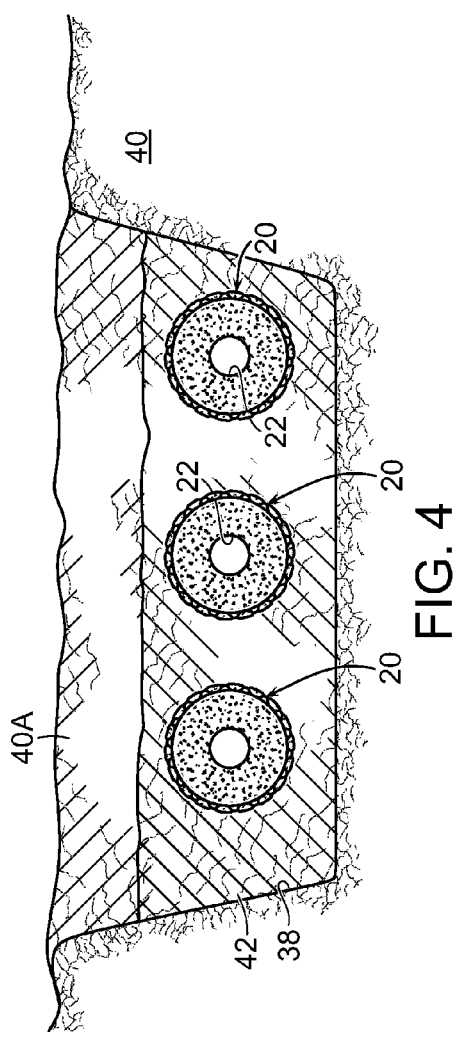
FIG. 4 is an elevation cross section view showing three drainage units of FIG. 1 in a sand filled trench of a leaching field.

FIG. 4 illustrates by example how a drainage unit 20 is used. FIG. 4 is a transverse cross section through natural soil 40 in which has been dug a trench 38, now filled with sand 42. In the example, there are three parallel drainage units 20 embedded in the sand. Backfill soil 40A covers the sand 42. During a typical use, when the drainage units 20 are part of a wastewater leaching system, wastewater from a source such as a septic tank is distributed by means a distribution box or the like, not shown, to the perforated conduits or pipes 22 of the three drainage units 20. During use, water flowing into pipes 22 flows from perforations in the pipe wall into the interstices of bead aggregate 26. The water flows radially outward from pipe 22, typically with a downward bias when the sand 42 is not water-saturated. The water then passes through netting 24, through geotextile base layer 34 of the quilt, into the pebbles 36 of the quilt; then through the geotextile cap layer 32; then into the surrounding sand 42 or such other material as may surround the drainage units in other installations; and, finally into the soil 40. In alternative embodiments, there is no sand and drainage units 20 are surrounded within the trench by backfilled natural soil, alternatively by crushed stone gravel instead of sand.

In a typical prior art drainage unit, after wastewater is initially received and stored within the interstices of the larger-bead aggregate 26, it passes through the netting of the sleeve and then through the fabric of any barrier layer adjacent to the sleeve and then into the surrounding medium. In prior art units the barrier layer may run partially or all around the drainage unit. See U.S. Pat. No. 8,256,990 of Koerner. While the geotextile barrier is intended to prevent infiltration of soil and the like into the bead aggregate, as pointed out in the Background a geotextile barrier can be a location where suspended solids in the wastewater accumulate and might inhibit flow.

In an exemplary drainage unit of the present invention, the wastewater has to pass through the aggregate/pebbles of the quilt 30 before entering the surrounding medium such as sand 42, except where there are necessary seams. Thus the wastewater flowing through a drainage unit 20 of the present invention may be filtered as it passes successively through the base layer 34 and the cap layer 32, and it is subject to microbiological treatment while passing through the interstices amongst pebbles 36.

The average particle size of the aggregate 36 in the quilt is preferably substantially smaller than the average particle size of the aggregate 26 that is contained within sleeve 24. Average particle size is determined by conventional means when, as is the case here, the plastic particles are irregular. If, in an example of the invention, the average particle size of the pebble 36 aggregate in the sleeve is one-quarter inch, and the average particle size of the aggregate 26 in the sleeve is one inch, then the ratio of quilt-aggregate to sleeve-aggregate particle size to less than 1 to 2, being 1 to 4.

The surface area per unit volume of the pebbles 36 is desirably substantially greater than the surface area per unit volume of the beads of aggregate 26; preferably at least 1.5 times greater. One calculation of shows exemplary pebbles of the second aggregate within the quilt provide about 55-60 percent more surface area per unit volume than do the exemplary beads of a preferred first aggregate which are dimensioned in accord with U.S. Pat. No. 6,467,996, mentioned above. By analogy with a trickling bed filter, desired aerobic microbiological action is enhanced in aggregate, namely within pebble aggregate 36, which has increased surface area. When the wastewater exits the drainage unit and enters sand 42 and then soil 40, as is well known it will usually be further microbiologically treated, according to conditions at those locations and the remaining activity of the wastewater.

Aggregate 26 provides structural integrity to drainage units of the prior art and of the present invention during use. That integrity includes strength sufficient to resist the load of overlying soil and things which traverse the soil surface. In this respect, the particles comprising the larger exemplary bead aggregate 26 interlock with each other better than do the smaller pebbles comprising aggregate 36. Thus the aggregate 26 provides a drainage unit of the present invention with strength and resistance to deformation during use. Having a relatively thin layer—and therefore relatively small amount—of pebbles, as characterizes the quilt of the present invention, will not significantly compromise satisfactory structural performance of drainage units of the present invention.

The layers 32, 34 of quilt layer 30 are fastened to each other by one or more means, such as a process selected from the group consisting of stapling, sewing, ultrasonic welding, fusion welding, adhesive bonding, all of which methods are known in the art of fabricating plastic sheet structures.

Other fastening or seam forming processes may be used, including those which are known or are to be developed in the future. The exterior surface layer 32 is preferably comprised of a layer having characteristics like barrier layers used on drainage units in the prior art. Its principle function is to keep the surrounding soil or other medium from moving into the interstices of the aggregate 26 of the essential drainage unit. The interior or base layer 34 of a quilt preferably is comprised of a coarser geotextile than is the cap layer 32 of the quilt. In an example of the invention, an about 0.006 inch thick Spunbond polyester fabric having a Frazier Air Permeability of about 780 cubic feet per minute per square foot at a pressure of 0.5 inch water column may be used for the base layer 34 and a nonwoven polypropylene needle-punched geotextile having an ASTM D 4491 permittivity of about $2\ s^{-1}$ may be used for the cap layer 32. Such exemplary base layer material has a lower permeability and is stiffer than the exemplary cap layer material. As used herein, the term geotextile refers to a fabric which is water permeable unless otherwise stated.

As mentioned in the Background, typically wastewater flowing into a drainage unit that is part of a leaching system will contain suspended solids. Over time, the solids can accumulate and block flow through the pores of geotextile fabric barriers which are used on drainage units. In the invention, the first coarser layer of the quilt cooperates with the second finer layer of the quilt. Coarse particulates are caught by the first fabric layer 34, thus lessening the particulate loading on the second layer which will catch smaller particulates. The treatment and degradation of the particulates is distributed between the first and second layers and the capacity of a drainage unit to handle a given loading of suspended solids is increased, compared to a drainage unit which has an exterior surface comprised of one layer. Spacing between the two layers is maintained by the presence of pebbles 36. Notwithstanding the benefits of using a combination of coarse and fine permeability materials in a quilt, in other embodiments of the invention the base layer and the cap layer may be of the same permeability. As mentioned above, the finer pebble aggregate still provides an advantage.

Of course, where there are seams 44, 48, flow through the quilt will be impeded, and such wastewater as passes through a seam will not encounter pebble aggregate. It is possible to construct a drainage unit like unit 20 where there is no segmenting of the quilt, that is, where there is no compartmentalization of the pebbles within the space between the base layer and cap layer. But during shipping and handling of the drainage unit prior to installation, the pebbles might easily shift and become unevenly distributed around the circumference of the drainage unit, resulting in unpredictable performance. Quilting with segments avoids that possibility, and having seams is a necessary and useful tradeoff.

Whether a user wants a stiff unit or a bendable drainage unit depends on the application. Most often it is desirable that drainage units be bendable along the lengthwise axis, so they fit readily in curved trenches. In a preferred embodiment such as shown in FIG. 1, the transverse seams 48 which define the ends of rectangular shape segments are aligned with each other; and thus they provide circumferential band locations which facilitate ready lengthwise bending. The bands formed by aligned seams 48 help address any increase in lengthwise stiffening which a drainage unit may have when there is a quilt, for instance a quilt comprised of whole-length strips as shown in FIG. 12, or for instance when the rectangular quilt segments are not aligned but are staggered as in common brickwork.

Since a quilt is made of flexible fabric and a quilt is curved as it forms the exterior of a drainage unit the dimensions of quilt segments can be distorted. There can also be gross distortion of the quilt at the ends of a drainage unit where it is attached to itself and any perforated pipe. Thus a reference herein to a quilt having certain shape segments is a reference to the nominal shape of the segments which comprise the preponderance of the segments. Thus, for example, the term "rectangular" and variations should be applied reasonably when characterizing segment shapes.

Fabrication of Quilts

Figure 6:
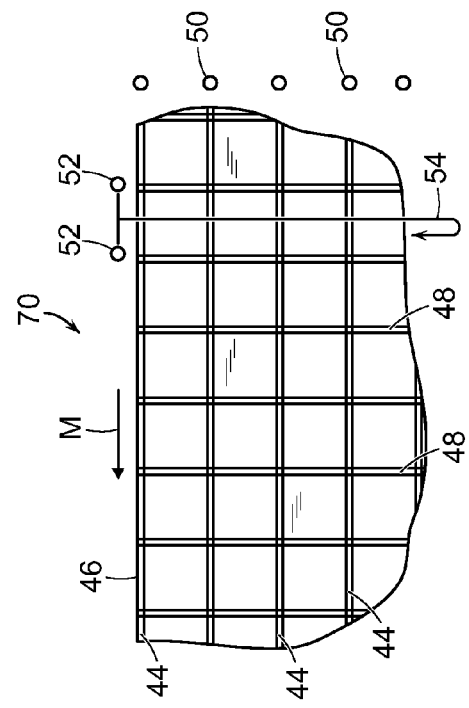
FIG. 6 is top view showing a portion of the rectangular-segmented quilt of the FIG. 1 drainage unit, as it is being fabricated in flat configuration by use of heads which fasten the fabric sheets of the quilt together.
Figure 7:
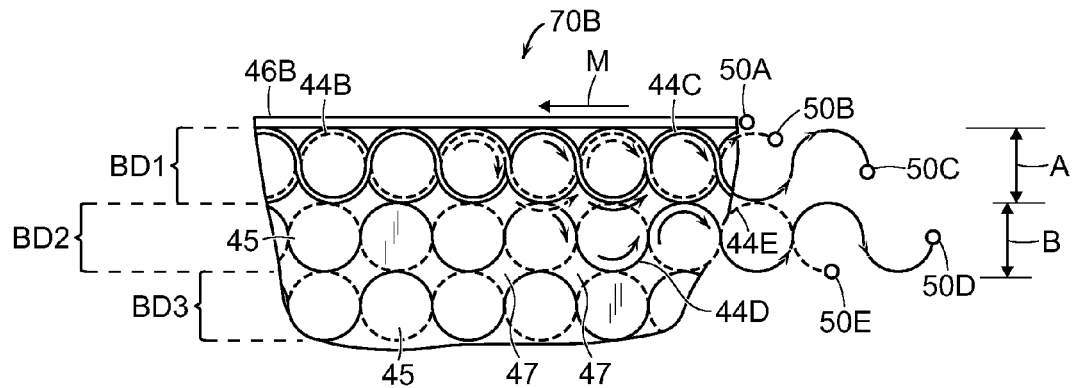
FIG. 7 is a view like FIG. 6, showing a quilt with nominally circular quilt segments along with stylized sewing heads, to illustrate a method of making the quilt.
Figure 7A:
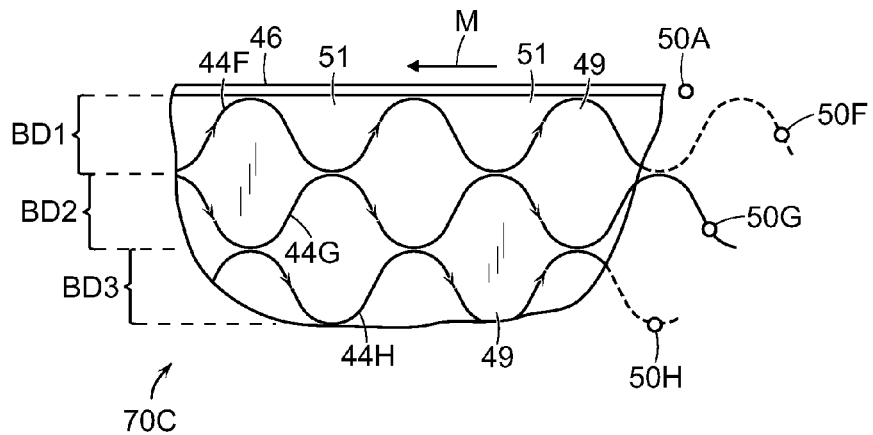
FIG. 7A is a view like FIG. 7, showing a quilt with serpentine seams which intersect each other to define oblong segments.
Figure 7B:
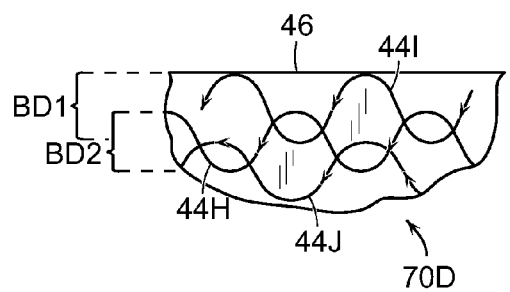
FIG. 7B is a view like FIG. 7, showing a quilt with serpentine seams which cross each other to make complex shape segments.

FIGS. 6-8 are fragmentary top views of quilts in the process of being formed. They illustrate a portion of flat quilt having an edge 46, as the quilt appears if it were laid on a flat surface prior to being wrapped around the exterior of an essential drainage unit. The Figures also serve to illustrate ways of fabricating the quilt, which will be better appreciated from the description below relating to FIG. 9. FIG. 6 shows a quilt with a rectangular segment pattern (in particular, a square pattern) like that which characterizes quilt 30 of drainage unit 20 in FIG. 1. FIG. 8 shows a quilt which has parallel rectangular segments (or strips) that extend the length of the drainage unit, when the quilt is put in place. FIGS. 6-8 are discussed further below. FIGS. 7, 7A and 7B show quilt embodiments having rounded or irregular shape quilt segments.

FIG. 9 is a perspective view, in part semi-schematic, illustrating some essential features of apparatus 18 and an associated manufacturing method that may be used for fabricating exemplary quilts 70, 70A, 70B, etc. which are rectangular in shape. Generally, the number 70 designates a quilt when it is being fabricated or ready for incorporation into a drainage unit; and the number 30 designates that same item when it is a part of a drainage unit. (Those same categorizations apply to 70 and 30 when they have prefixes, as in elements 170, 130, etc. in other figures.) FIG. 10 is a lengthwise elevation cross section of the apparatus 18 and shows a quilt being formed. FIG. 12 is a top view of a typical quilt product of apparatus 18, showing how the continuous strip of quilting which is produced by the machine may be cut at lines 68 to form rectangular quilts 70 ready for placement on an essential drainage unit. FIG. 13 illustrates how a rectangular quilt blanket 70 may be wrapped around the exterior of an essential drainage unit 16 to become a quilt 30.

Returning again to the machine and method illustrated by FIG. 9-11, the arrows show the motions of the elements of the apparatus and quilt components. In the particular example shown, the rectangular quilts 70 which are being produced have the elongated rectangular segment pattern which is shown in FIG. 8. Geotextile fabrics 34 and 32 are provided as respective pay-off rolls 54, 56, supported on trunnion, not shown. (The terms geotextile and fabric are used interchangeably. A geotextile is a woven or non-woven textile product that is specially engineered for use in the exterior environment and when buried in soil.) The fabricated quilt layer 30 is gathered as take up roll 64 which powered by a driver, not shown.

In operation of the apparatus 18, layer 34 is pulled lengthwise along work table 62 by rotation of take up roll 64. Pebbles 36 are deposited as a layer on the surface of fabric layer 34 by means of hopper 60 and associated cog-feeder 66. Fabric layer 32 is drawn from roll 56 by virtue of being seam-attached to layer 34, as will be described. Layer 32 passes under idler roller 58, thereby forming a sandwich assembly comprising the base layer 34 and cap layer 32 into which are deposited pebbles 36.

The assembly comprising the two geotextile layers passes by a plurality of sewing heads 50 which form lengthwise seams 44, to make an exemplary quilt pattern like that shown in FIG. 8. Sewing heads 50 are only schematically illustrated. They may be of a commercial type suited for the thicknesses and materials being joined. In one mode of operation, the pebbles under the sewing heads are simply crushed by the sewing heads and associated feet or rollers. In another mode, hopper 66 is arranged so the pebbles are deposited at spaced apart locations across the width of the machine; and thus there will be lengthwise running channels in the pebble layer where seams are wanted. In another alternative, plows create the channels.

Transverse seams 48, in particular seams 48A, 48B, are created by traversing fastening heads 52 using stitching or one or more of the joining methods mentioned elsewhere herein. Seam 48A defines the end one rectangular quilt 70A and seam 48B defines the beginning of the next rectangular quilt. Sewing heads 52 are part of a flying assembly. That is, the heads 52 are attached to a mechanism (not shown) which moves the heads downstream at the speed of the moving fabrics 32, 34, when the heads are simultaneously moved transverse to the length of the quilt being formed. After the seams 48A, 48B are formed, the heads retreat to the home position shown in FIG. 9, ready for further action when the desired length of quilt passes by their home position.

Alternatively, the motion of the sandwich comprising the fabric layers and pebbles may be momentarily ceased while transverse seams 48A, 48B are being formed. When the rectangular/square segment quilt pattern shown in FIG. 1 and FIG. 6 is desired, the same kind of transverse head 52 motion may be used, but more frequently.

The action of pebble feeder 66 may be intermittent, so there are regions along the length of moving fabric 34 where there are no pebbles, to enable more easy formation of the transverse seams. Plows or other channel making devices may be alternatively used to clear away pebbles and ease the fabrication of transverse seams.

FIG. 11 is a fragmentary portion of a modified FIG. 9 apparatus, showing sewing heads 50E which are staggered downstream along the length of work table 62, which is the direction of downstream motion of the fabric layers. The utility of this will be appreciated when forming the quilt illustrated in FIG. 7 is discussed.

As illustrated by FIG. 12, quilt accumulated on a take up roll is removed from the machine 18 and subjected to a further manufacturing operation: the quilt material is drawn from the roll and severed along a line 68, which runs in the space between the transverse seams 48A, 48B to provide separate quilts 70 that may be wrapped around an essential drainage unit, as illustrated by FIG. 13 which is discussed below.

Referring again to the top views of FIGS. 6 to 8, the manner in which sewing heads create seams is illustrated. In FIGS. 6 to 8 the segments are illustrated with paths direction of movement of the fabrics as indicated by arrow M is from right to left; that compares with left to right movement in FIG. 9. A portion of a quilt including side edge 46 is shown in each Figure.

In FIG. 8, quilt 70A has only lengthwise seams 44 which are formed by heads 50. In FIG. 6, quilt 70 has lengthwise seams 44 created by sewing heads 50 and transverse seams 48 created by heads 52.

In FIG. 7, quilt 70B has a combination of dominant circular segments 45 in combination with scalloped edge segments 47. The motion of the sewing heads which forms the segments is more complex than in quilts with rectilinear segments. But the method illustrated avoids the mechanical complexities associated with flying heads 52, or with stopping and starting the quilt to make transverse seams. In the apparatus illustrated in FIG. 7, head 50A forms an outer seam along edge 46 of the quilt; head 50A is static relative to the width of the quilt. Typical heads 50B, 50C, 50D and 50E translate transverse to the length of the quilt and direction of its movement relative to the heads, indicated by arrow M. Heads 50B and 50C move in a band BD1 to respectively create seams 44B and 44C. Heads 50D and 50E move in a band BD2 to create seams 44D and 44E. (Seams are shown variously as dashed, solid single line, double line, etc. simply to enable distinguishing one seam from the other.) Other heads, which are not shown, form the other seams. Since the heads are staggered downstream, each head can oscillate transversely without interfering with the other head.

To recapitulate, heads 50B, 50C move within a band BD1, heads 50D, 50E move with in BD2, etc. Said bands are regions running lengthwise along the nascent quilt. The motion of each head creates a serpentine seam within a respective band. In the FIG. 7 embodiment, seams within one band intersect with each other to form generally circular segments 45. Seams within one band meet but do not cross the seams in the adjacent band.

FIG. 7A shows an embodiment of the invention which has similarities to the embodiment of FIG. 7. Again, there is a multiplicity of heads, three of which are shown creating a portion of nascent quilt 70C. Each of heads 50F, 50G, 50H creates a respective serpentine seam 44F, 44G, 44H in a respective band BD1, BD2, BD3. Oblong quilt segments 49 are predominately created, along with half-oblong segments 51. The serpentine seams within one band intersect but do not cross the seams in an adjacent band.

FIG. 7B shows another embodiment with some similarities to that of FIG. 7A. Quilt 70D is formed with serpentine seams 44H, 44I and 44J. Exemplary bands BD1 and BD2 overlap, and the seams formed in one band cross the seams in the adjacent band to create complex shape segments. Still other variations of quilts having different intersections of serpentine bands may be constructed. In the foregoing descriptions relating to seam forming, it will be appreciated that the motion between the sewing heads and the fabric is relative. Thus, while static sewing heads have been shown, the invention can be carried out by holding the fabric stationary on a table and moving the heads. While sewing heads which provide stitching in the fabric have been described, other means for joining the fabric may be employed as equivalents, including stapling, ultrasonic or other melt-bonding, adhesive bonding, and so forth, each having an associated head for effecting the particular fastening.

The foregoing method invention may be generally described as follows: A method for making a drainage unit having a quilted surface comprises first forming a quilt by sandwiching pebble aggregate between a first sheet and a second sheet, creating seams by sewing or equivalent means, so the sheets are fastened to along the length of the fabric; and creating transverse seams which define the ends of rectangular quilts, and depending on the segments being formed, rectilinear segments. Rectangular quilt pieces are then wrapped around an essential drainage unit and affixed in place, to form an invention drainage unit having a quilt surface. Quilts may have rectilinear segments or complexly curved segments. In another kind of quilt, serpentine lengthwise seams are formed within parallel lengthwise band regions of the nascent quilt and (a) the seam in one band intersects a seam in the same band or (b) a seam in one band intersects the seam in an adjacent band or (c) a seam in one band crosses the seam in an adjacent band. With the scope of invention, other segment shapes may be formed than have been exemplified.

FIGS. 15-18 illustrate an alternative apparatus and method for fabricating quilt. Various actuators and controls which make the components of the system move are not shown but will be understood by the artisan. Generally, in the apparatuses of FIG. 15 and FIG. 18 two sheets of fabric are mated and fastened to each other to form a sheet structure which has vertically disposed channels analogous to the process described in connection with FIG. 9. The quilt 170, being formed, moves vertically downward during the manufacturing process. Aggregate 36 is dropped into vertical channels and horizontal seams are created, so a multiplicity of rectangular quilt segments 43A are formed.

Figure 15:
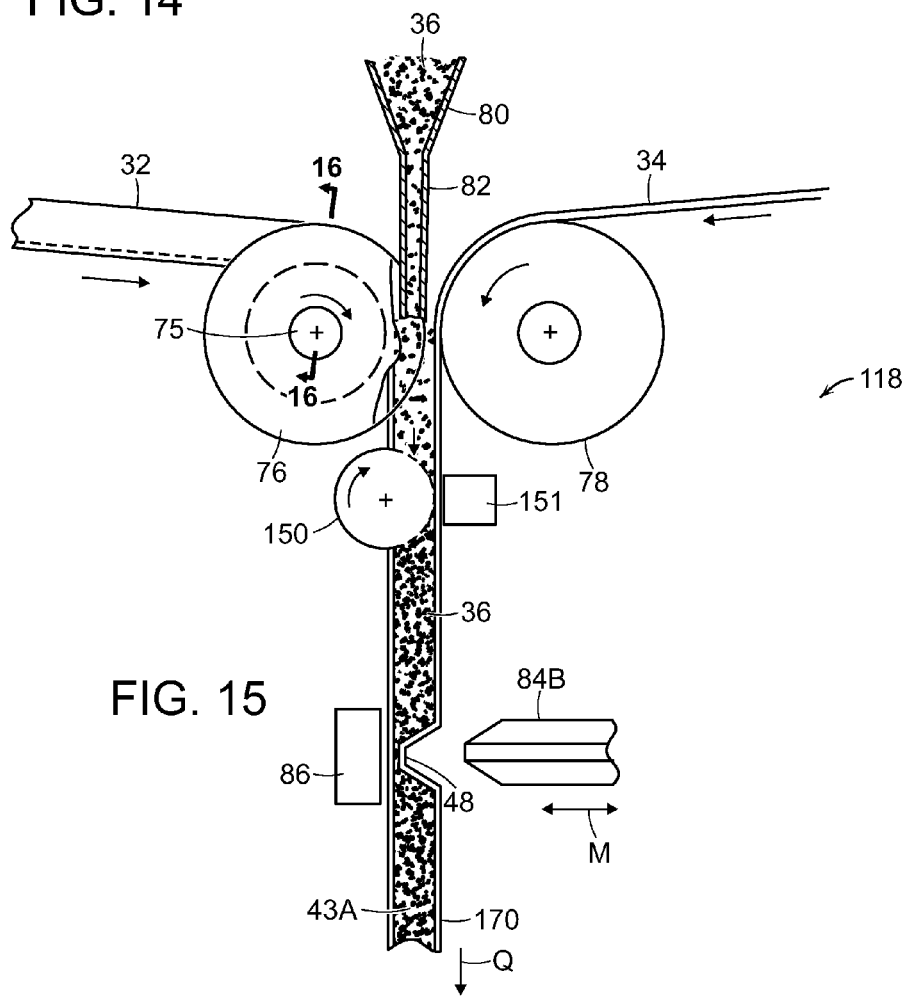
FIG. 15 is a vertical cross section view of a portion of apparatus for forming a quilt, where the quilt moves vertically during fabrication.
Figure 16:
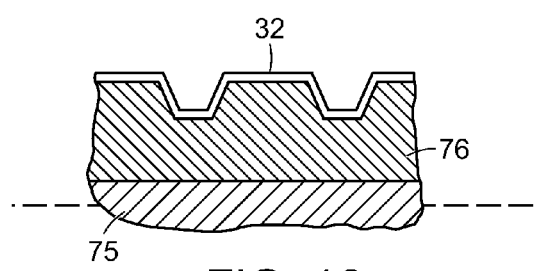
FIG. 16 is a partial cross section through a roller of the FIG. 15 apparatus.
Figure 17:
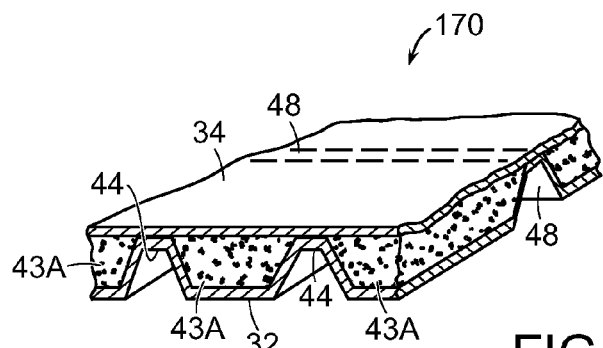
FIG. 17 shows an exemplary product produced by the apparatus of FIG. 15.

FIG. 15 is vertical cross section through a portion of the apparatus 118. Arrows show the motion of the parts of the apparatus and sheet and quilt. A portion of an exemplary quilt 170 which is produced by the apparatus 118 is shown in FIG. 17. The apparatus is shown in simplified form, i.e., at only one vertical plane. The more complex configuration of the whole apparatus will be understood in the context of the description associated with FIGS. 9 to 10A and the following. Ultrasonic welding is referred to the exemplary fastening means; but any of the means described elsewhere herein may alternatively be used.

Fabric which forms quilt layers 32, 34 is drawn from spools which are not shown. Fabric which comprises sheet/layer 32 runs over roller 76. As shown in the partial cross section of FIG. 16, roller 76 has a grooved surface; thus the sheet 32 is contoured so it has lengthwise running peaks and valleys as it runs over the roller. Fabric which comprises sheet/layer 34 is drawn over roller 78 and mated vertically with contoured sheet 32 to form a geotextile assembly. An ultrasonic welder is shown schematically. It comprises which a horn 151 (i.e., an element which applies ultrasound waves to the geotextile layers) and an associated anvil 150 which is a wheel-like element. The ultrasonic welder creates a vertical seam 44 where a valley of the layer 32 contacts the layer 34. The seam in combination with an adjacent seam defines a vertical channel of the geotextile assembly.

In the full apparatus, there is a multiplicity of vertical seam welders. They are spaced apart in a direction which is perpendicular to the plane of the FIG. 15 illustration. Thus, a multiplicity of vertical seams 44 and associated vertical channels are formed in a geotextile assembly, analogous to how the seams and channels are formed in making quilt 70A shown in FIG. 9.

A multiplicity of tubes 82, one of which is shown, feed aggregate 36 from hopper 80 into each vertical channel. As the being-formed quilt moves vertically downwardly, indicated by arrow Q, spaced-apart horizontal seams 48 are formed. Ultrasonic welder horn 86 which has an associated anvil 84B periodically moves toward the geotextile assembly, and then away as indicated by arrow M, while traversing the geotextile assembly to form a horizontal seam 48. Thus the vertical channels are converted into rectangular aggregate-filled segments 43A of quilt 170. In the manufacturing process, flow of aggregate through the tube 82 is preferably periodically interrupted, so that a horizontal weld 48 can be made just above the elevation of the elevation of the just-deposited aggregate.

Figure 18:
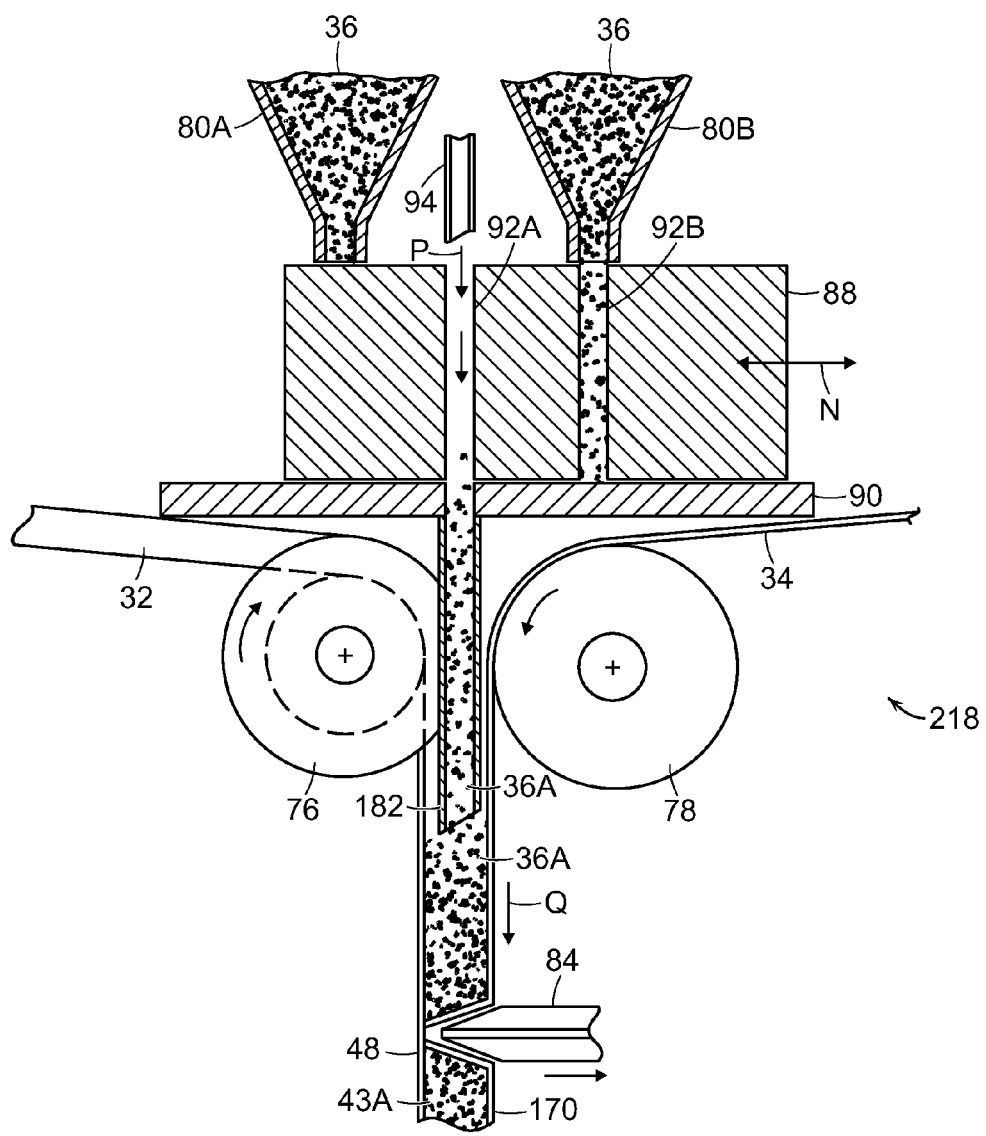
FIG. 18 is a view like FIG. 15, showing a modification of apparatus for making quilt.

FIG. 18 shows apparatus 218 which is a modification of the apparatus 118. Apparatus 218 comprises a subsystem that quickly deposits a predetermined amount of aggregate into a vertical quilt channel, after which a horizontal weld is made just above the elevation of the aggregate.

In the apparatus of FIG. 18, the way of mating the sheets 32, 34 and forming the vertical channels is the same as described for FIG. 15. As a starting point, assume there is already a present horizontal weld seam 48, at the top of segment 43A of quilt 170. Aggregate 36 is then deposited into the vertical channel above the seam by means of tube 182 which extends downwardly from base plate 90. Quilt 170 is then moved downwardly, and a second seam (not shown) is formed at the elevation which just above the height of the just-deposited aggregate. That creates a new segment 43A. The second seam defines the bottom of the next to-be-formed segment. More aggregate is deposited in the channel above the second seam as the being-formed quilt moves downwardly; then another horizontal seam is made, and so forth.

In apparatus 218 a predetermined amount of aggregate is delivered by means of a mechanism comprising shuttle 88. The shuttle moves left-right on base 90 as indicated by arrow N in FIG. 18. Shuttle 88 has two spaced apart vertical cavities 92A, 92B. Stationary hoppers 80A and 80B are positioned above the shuttle so that each cavity 92A, 92B may be filled with aggregate 36 from respective hoppers 80A, 80B, when the shuttle position locates a cavity beneath a hopper.

In FIG. 18, shuttle 88 is at its far right position and vertical cavity 92B has just been filled by hopper 80B. Vertical cavity 92A is at the same time positioned over spout 182. A periodic compressed air jet, indicated by arrow P, emanates from nozzle 94. The air jet applies force to aggregate 36A which is in cavity 92A so, as shown, the aggregate moves down spout 182 and into the vertical channel of the quilt 170 being formed. When the aggregate is in place within the quilt channel, quilt 170 moves vertically down as indicated by arrow Q, momentarily stopping while horizontal welder 84 moves toward the quilt to seal the sheets 32, 34 to each other just above the aggregate 36A, thus creating a new segment 43A. At the same time, shuttle 88 moves laterally to the left so that cavity 92B is positioned over the tube 182 and cavity 92A is positioned under hopper 80A. The blowing, filling, welding and shuttling steps are repeated again and again. In this way, quilt can be manufactured in a rapid and economic way. Other means for delivering a predetermined amount of aggregate 36A may be employed. For instance, as known in the art, weighing machines having discharge bins may be used to deliver pellets to a tube like tube 182 that extends into the vertical channel of a quilt being formed; or machines which count the number of pellets being fed past a point by a vibratory feeder may be used.

An essential drainage unit 16 for receiving a quilt may be fabricated by means which have been commercially employed heretofore by manufacturers of drainage units. Reference may be made to U.S. Pat. Nos. 5,015,123, 5,154, 543, and 5,535,499, the disclosures of which are hereby incorporated by reference. Essential drainage units may be made by other means and may have constructions different from those shown in the foregoing patents.

The next step is to apply a quilt to the essential drainage unit 16, to make an embodiment of drainage unit 20 of the present invention. A quilt 70 is fabricated using a method described above, or another method.

In one approach, illustrated in part by FIG. 13, the quilt 70 has a length approximating the length of the essential drainage unit which will be encased in the quilt and the width of the quilt is preferably about equal to, more preferably greater than, the circumference of the essential drainage unit to which the quilt is applied. FIG. 13 shows drainage unit 120 which in the process of being formed by wrapping quilt 70 around the around the exterior of essential drainage unit 16. Preferably the width of the quilt will be such that lengthwise edge 46A will extend beyond the edge 46 when the quilt is wrapped around the essential drainage unit 16, so there is an about 4 inch overlap of the quilt upon itself. Alternately, the lengthwise edges 46, 46A of the quilt 70 may be secured to each other at a seam which runs lengthwise along the length of the drainage unit. A quilt may be attached to itself by sewing, stapling, gluing, ultrasonic welding, or other means described elsewhere herein or known in the art. The circumferential-running quilt edges, which are in proximity to the ends of the essential drainage unit, where a center pipe 22 is exposed if present, may be gathered together about the pipe with a cord or clamp or stitching, etc.; or the edges may be secured to themselves or even left unsecured or un-gathered.

In still other alternative ways for fabricating drainage units, a quilt may be secured in place around the outer surface of the essential unit by sewing or adhering of the quilt to the sleeve 26. Or the quilt may be secured to the circumference of an essential drainage unit by means of circumferential cord or strapping which runs around the exterior of the quilt. In this embodiment, with reference to FIG. 1, a multiplicity of straps may be run around the exterior of the quilt, parallel to the aligned-seams 48. See also U.S. Pat. No. 8,256,990 of Koerner, mentioned above, for how straps may be used.

Figure 19:
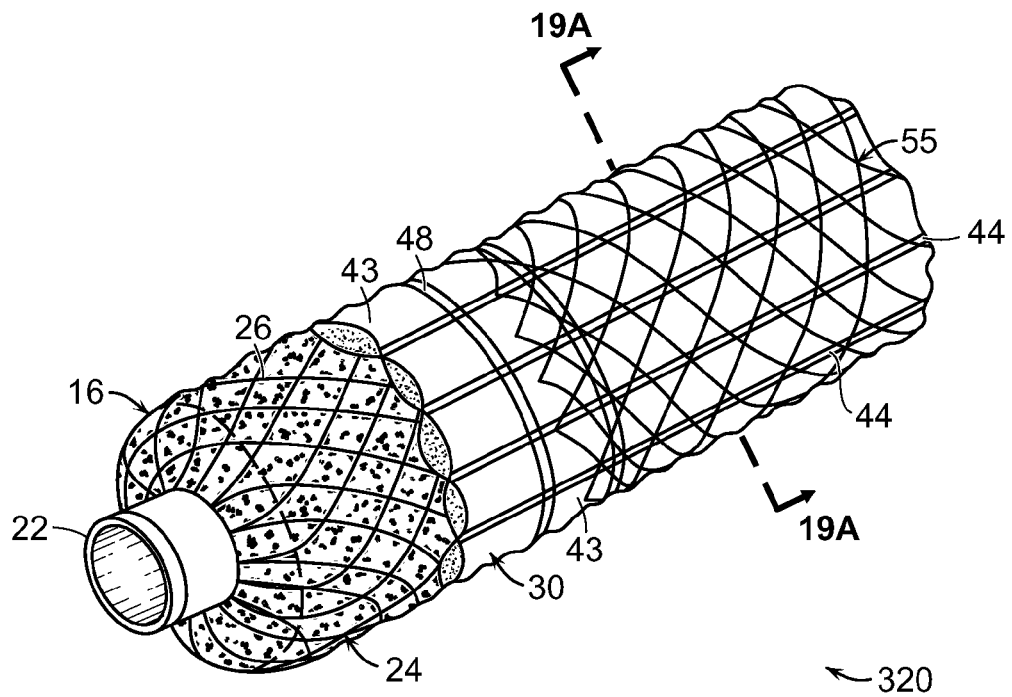
FIG. 19 is a perspective partial-cutaway view like FIG. 1, showing a drainage unit where the quilt is secured to the exterior by a sleeve of netting.
Figure 19A:
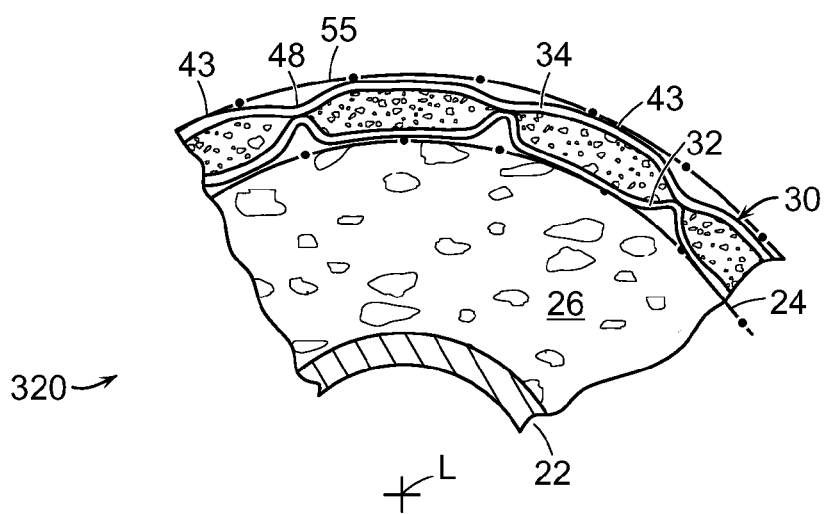
FIG. 19A is a partial cross section through the drainage unit shown in FIG. 19.

FIG. 19 is a perspective partial-cutaway view, and FIG. 19A is a partial transverse cross section, of a drainage unit 320 where quilt 30 is secured to the exterior of the essential drainage unit by second sleeve 55 of netting. As in other figures, the essential drainage unit 16 comprises aggregate 26 contained by first netting-sleeve 24. Preferably, the quilt is wrapped around the essential drainage unit so it overlaps itself by 2 to 4 inches, in the manner described in connection with FIG. 13. The second or outer sleeve 55 may be put in place by different ways. In one embodiment the sleeve is provided in the form a tube or bag-like structure which is slid lengthwise along the exterior surface of the quilt while the quilt is temporarily secured in place.

Figure 20:
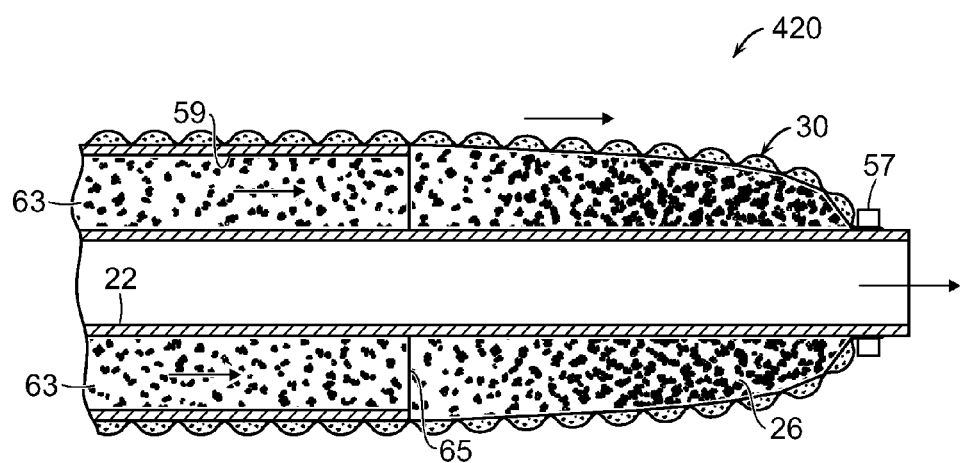
FIG. 20 is a vertical cross section through a mandrel from which a quilt sleeve is payed off onto a perforated pipe moving through the mandrel, also showing how aggregate blown down the bore of the mandrel fills the quilt.
Figure 22:
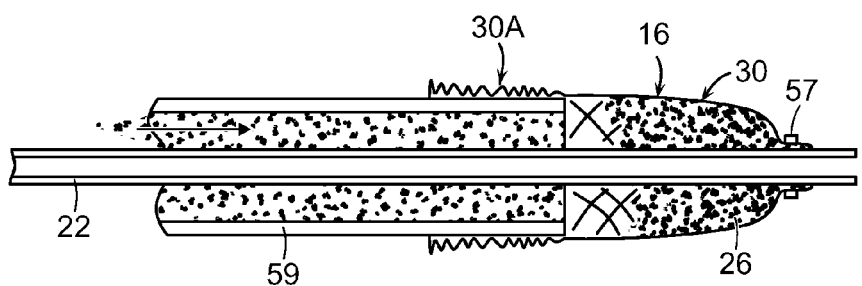
FIG. 22 is a cross section of a mandrel holding nicked sleeve netting showing how an essential drainage unit is formed in accord with the prior art.

As mentioned above, with respect to making an essential drainage unit 16, reference may be made to the apparatus and methods of making which are described or obvious from U.S. Pat. Nos. 5,657,527 and 6,173,483 of Houck et al., the disclosures or which are hereby incorporated by reference. FIG. 22 is a cross section through elements of prior art apparatus. A sleeve of netting 30 drawn from the exterior of a hollow cylindrical mandrel 59, through which a perforated pipe 22 is thrust lengthwise. The rucked netting 30A is drawn off the mandrel by the pipe 22 to which it is tied by strap 57. Bead aggregate is blown down the mandrel interior as indicated by the arrow, to fill the space between the sleeve and the perforated pipe. FIG. 20 shows how those same principles may be used to make a drainage unit 420. Quilt 30 in the form of a sleeve which is on the exterior of mandrel 59 is initially secured to the end of perforated pipe 22 by tie-wrap 57. Movement of the pipe downstream as indicated by the arrow draws the quilt sleeve from the end 65 of mandrel 59 while aggregate 26 is blown down the annular space 63 between the perforated pipe 22 and mandrel. When the desired length of drainage unit is achieved, the upstream end of the quilt is secured to the upstream end of the perforated pipe.

Figure 21:
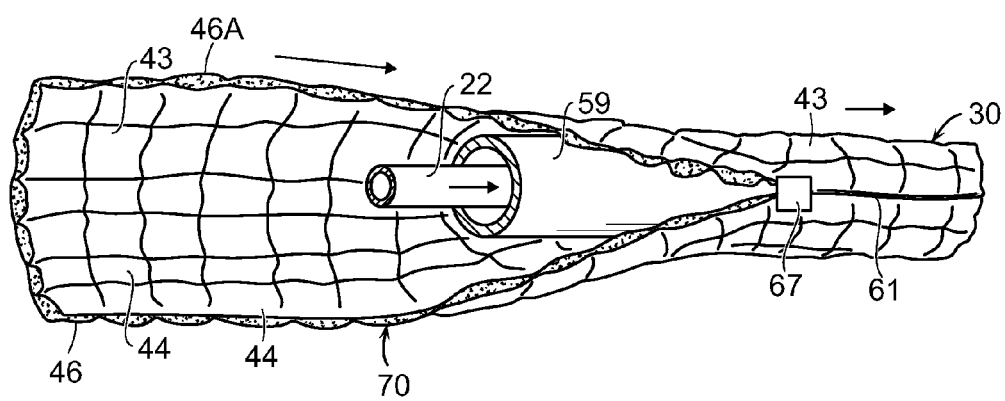
FIG. 21 shows a mandrel like that in FIG. 1 along with a quilt as it is being fed onto the mandrel and edge-fastened so it becomes a sleeve like that shown in FIG. 20.

It will be appreciated that nicking quilt on the mandrel may not be readily done, given its bulk compared to a netting sleeve, and thus the quilt may be formed into a sleeve as it approaches the mandrel. FIG. 21 is a simplified illustration which shows mandrel 59 and perforated pipe. Quilt 70 in the form of sheet is converted into a sleeve that runs along the exterior of mandrel 59. The quilt sheet 70 is drawn from a spool or other source (not shown) and curved upon itself by an unshown collar so that it assumes the form a cylinder circumscribing the exterior of mandrel 59. A fastening device 67, such as a sewing head or stapler or welder, secures the edges 46, 46A of the quilt sheet 70 to each other so that the sheet becomes cylindrical sleeve quilt 30. The mandrel in the foregoing apparatus may have other than horizontal orientation in other embodiments of the invention. Technology which may be employed in the foregoing process or in alternative ways may be ascertained in U.S. Pat. Nos. 7,178,224, 7,475,477, and 7,600,308 all of Bussey, Jr. et al., the disclosures of which are hereby incorporated by reference.

Further Embodiments of Drainage Units

FIG. 13A shows another embodiment of drainage unit 220, where quilt 70 only runs around a portion of the circumferential exterior of the essential drainage unit 16. Quilt 70 may be secured to the drainage unit by fastening to the sleeve netting 24, by stitching, stapling, fusion, adhesive, etc., or by a second netting sleeve like sleeve 55 described in connection with FIGS. 19 and 19A. In the generality of the invention a perforated pipe running through the aggregate is optional, although preferred. FIG. 13A also shows that exemplary unit 220 has no lengthwise perforated pipe.

As shown in FIG. 3, the base layer 34 of a quilt 30 of drainage unit 20 is in contact with the netting of sleeve 24 and aggregate 26 that is contained by the netting, given the large openings in the netting. In an alternative embodiment drainage unit 20A, shown in FIG. 5, there is a further layer 28 between the sleeve 24 and the quilt base layer 34. Layer 28 may be a fibrous mass, or a disorganized spaghetti-like structure as characterizes the commercial product Enka mat, or a geonet structure (a coarse, heavy duty netting, referred to further below). Layer 28 may provide structural stiffness to drain 20A (when that is desired) as well as providing a zone for further treatment of wastewater. Layer 28 spaces apart the base layer 34 from the aggregate which lies within the interstices of netting 24, lessening any masking of the openings in layer 34 which might result when the layer contacts the aggregate.

Figure 14:
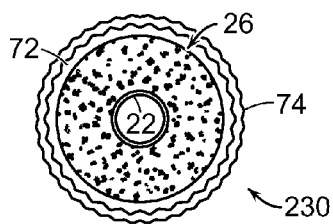
FIG. 14 is a diametrical cross section of a drainage unit comprising aggregate contained within a sleeve, a circumscribing geonet, and circumscribing geotextile (compared to a quilt) around the exterior surface of the geonet.

FIG. 14 shows a transverse cross section through exemplary drainage unit 230 which comprises aggregate, pipe, and netting of an essential drainage unit 16. An essential drainage unit 16 is surrounded by one or more layers of geonet 72, that is, coarse mesh plastic material. Geonet 72 is overlaid by geotextile fabric 74, such as fabric similar to the fabric of layers 32, 34 of an exemplary quilt. (When such kind of fabric has been placed on the exterior of an essential drainage unit in the prior patent art, it has been called a barrier.) Unit 230 does not comprise a quilt. If a quilt was substituted for layer 74, the product would be like that shown in FIG. 5.

A preferred geonet useful in this embodiment and the embodiment of FIG. 5 is Transnet Geonet 220, made of high density polyethylene. The preferred geonet layer has a thickness of about 0.22 inches and diamond shape mesh openings of about 0.4 by 0.7 inches. The material has an open area of 65-70 percent. The geonet layer 72 spaces apart the fabric 74 from outer surface of the essential drainage unit and facilitates flow through the fabric 74. In the absence of the geonet, the outer fabric contacts the aggregate, since a typical sleeve netting allows such contact. That contact can result in masking, that is, the creation of regions where flow through the outer fabric is blocked, possibly to the extent that 45 to 50 percent of the fabric openings may be masked. The geonet has openings which are intermediate in size between the openings of the first netting sleeve 16 and the openings of the geotextile of the quilt.

The invention, with explicit and implicit variations and advantages, has been described and illustrated with respect to several embodiments. Those embodiments should be considered illustrative and not restrictive. Any use of words such as "preferred" and variations suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. A drainage unit, for receiving and collecting water when buried in soil or other particulate material, having a length, a diameter, a nominally cylindrical exterior, and opposing ends, comprising: a generally cylindrical mass of first aggregate; and, a quilt made of water permeable geotextile running around all or part of the circumference of said first aggregate mass, the quilt comprised of a multiplicity of interconnected segments, each segment comprising an internal cavity containing a second aggregate, wherein the second aggregate has an average particle size which is smaller than the average particle size of the first aggregate.

2. The drainage unit for receiving and collecting water when buried in soil or other particulate material, having a length, a diameter, a nominally cylindrical exterior, and opposing ends, comprising: a generally cylindrical mass of first aggregate; and, a quilt made of water permeable geotextile running around all or part of the circumference of said first aggregate mass, the quilt comprised of a multiplicity of interconnected segments, each segment comprising an internal cavity containing a second aggregate; wherein the quilt is comprised of a first layer of geotextile which is fastened to a second layer of geotextile at seams formed by a process selected from the group consisting of ultrasonic welding, stitching, adhesive bonding, fusion welding, stapling and combinations thereof; wherein the first layer of the geotextile faces the cylindrical mass of aggregate and the second layer of geotextile faces the exterior of the drainage unit, wherein the first layer has a water permeability which is different from the water permeability of the second layer.

3. The drainage unit of claim 1 wherein the second aggregate comprises particulate having an average particle size which is less than half the average particle size of the particulate of the first aggregate.

4. The drainage unit of claim 3 wherein the first aggregate has an average particle size which is greater than about one inch and the second aggregate has an average particle size which is about one-quarter inch (0.6 cm) or less.

5. The drainage unit of claim 1 further comprising a perforated pipe running lengthwise within the first aggregate, for flowing water within the drainage unit, the pipe having opposing ends one of which is exposed at each of the opposing ends of the drainage unit, wherein the quilt is fastened to each pipe opposing end.

6. The drainage unit of claim 1 further comprising a sleeve of netting running around the cylindrical mass of aggregate, underneath the quilt.

7. The drainage unit of claim 2 wherein the water permeability of the first layer is higher than the water permeability of the second layer.

8. The drainage unit of claim 1 further comprising: (a) a first sleeve of netting running around the cylindrical mass of first aggregate underneath the quilt; and (b) a second sleeve of netting running around the quilt, for holding the quilt in position upon the first sleeve of netting and mass of first aggregate.

9. The drainage unit of claim 1 wherein the quilt comprises (a) a base layer of geotextile which is in contact with either the first aggregate mass or with an optional sleeve of netting that contains the first aggregate mass; and (b) a cap layer of geotextile which faces toward the exterior of the drainage unit; wherein the base layer has a higher water permeability than the cap layer, and wherein the cap layer is more undulating than the base layer.

10. The drainage unit of claim 1 wherein the quilt comprises (a) a cap layer of geotextile which is in contact with either the first aggregate mass or with an optional sleeve of netting that contains the first aggregate mass; and (b) a base layer of geotextile which faces toward the exterior of the drainage unit; wherein the cap layer has a higher water permeability than the base layer, and wherein the cap layer is more undulating than the base layer.

11. The drainage unit of claim 1 wherein the quilt comprises two layers of geotextile fastened to each other at seams which define quilt segments, each layer undulating as an effect of the seams and one layer presenting the exterior surface of the drainage unit; wherein the first layer has a first water permeability and the second layer has a second water permeability which is less than said first water permeability.

12. The drainage unit of claim 1 wherein the quilt has a preponderance of segments which are shaped as one of lengthwise strip segments, rectangular segments, circular segments, or curved edge segments.

13. The drainage unit of claim 12 wherein the quilt has a multiplicity of rectangular segments defined by a combination of first group of seams which run lengthwise along the drainage unit and a second group of seams which run transverse to the length of the drainage unit; and wherein the seams of the second group are aligned to form circumferential bands, the bands providing preferential locations for lengthwise bending of the drainage unit.

14. A drainage unit, for receiving and collecting water when buried in soil or other particulate material, having a length, a diameter, a nominally cylindrical exterior, and opposing ends, comprising: a generally cylindrical mass of first aggregate; and, a quilt made of water permeable geotextile running around all or part of the circumference of said first aggregate mass, the quilt comprised of a multiplicity of interconnected segments, each segment comprising an internal cavity containing a second aggregate; wherein the quilt comprises two layers of geotextile fastened to each other at seams which define quilt segments, each layer undulating as an effect of the seams and one layer presenting the exterior surface of the drainage unit, wherein the undulation of the exterior surface area layer provides the drainage unit with a surface area per unit length that is greater than the surface area of a same exterior dimension drainage unit having a smooth surface made of the same geotextile which comprises the exterior surface layer.

15. The drainage unit of claim 14 wherein said surface area per unit length of the drainage unit is at least about 2 percent greater than the surface area per unit length of a drainage unit of a same exterior dimension drainage unit having a smooth surface made of the same geotextile which comprises the exterior surface layer having the same diameter and a smooth exterior surface.

16. The drainage unit of claim 15 further comprising a perforated pipe running lengthwise through the mass of aggregate.

17. The drainage unit of claim 1 wherein the quilt runs around the exterior of drainage unit and overlaps on itself, optionally with a lengthwise seam in vicinity of the overlap.

18. The drainage unit of claim 1 having a diameter between about ten inches (25.4 cm) and about twelve inches (30.5 cm), wherein the thickness of the quilt is between about three eighths inch (1 cm) and about five eighths inch (1.6 cm).

19. A leaching field comprised of a multiplicity of interconnected drainage units of claim 1 which are buried in soil.

20. A leaching field comprised of a multiplicity of interconnected drainage units of claim 2 which are buried in soil.

21. The drainage unit of claim 1 wherein the quilt comprises (a) a base layer of geotextile which is in contact with either the first aggregate mass or with an optional sleeve of netting that contains the first aggregate mass; and (b) a cap layer of geotextile which faces toward the exterior of the drainage unit; wherein the base layer has a higher water permeability than the cap layer, and wherein the cap layer is more undulating than the base layer.

22. The drainage unit of claim 1 wherein the quilt comprises (a) a cap layer of geotextile which is in contact with either the first aggregate mass or with an optional sleeve of netting that contains the first aggregate mass; and (b) a base layer of geotextile which faces toward the exterior of the drainage unit; wherein the cap layer has a higher water permeability than the base layer, and wherein the cap layer is more undulating than the base layer.

* * * * *